(12) United States Patent
Wendt et al.

(10) Patent No.: US 11,297,592 B2
(45) Date of Patent: Apr. 5, 2022

(54) ELECTRONIC BEACON FOR A LOCALIZATION SYSTEM

(71) Applicant: SIGNIFY HOLDING B.V., Eindhoven (NL)

(72) Inventors: Matthias Wendt, Würselen (DE); Peter Deixler, Arlington, MA (US); Harald Josef Günther Radermacher, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 529 days.

(21) Appl. No.: 16/323,340

(22) PCT Filed: Jul. 24, 2017

(86) PCT No.: PCT/EP2017/068666
§ 371 (c)(1),
(2) Date: Feb. 5, 2019

(87) PCT Pub. No.: WO2018/024533
PCT Pub. Date: Feb. 8, 2018

(65) Prior Publication Data
US 2021/0289464 A1    Sep. 16, 2021

(30) Foreign Application Priority Data
Aug. 5, 2016   (EP) .................... 16182991

(51) Int. Cl.
*H04W 64/00* (2009.01)
*G01S 1/04* (2006.01)
*H04W 52/02* (2009.01)

(52) U.S. Cl.
CPC .......... *H04W 64/003* (2013.01); *G01S 1/042* (2013.01); *H04W 52/0216* (2013.01); *H04W 52/0251* (2013.01); *H04W 52/0274* (2013.01)

(58) Field of Classification Search
CPC .......... H04W 64/003; H04W 52/0216; H04W 52/0274; H04W 52/0251; G01S 1/042; G01S 5/01; G01S 5/011; G01S 5/012; G01S 5/013; G01S 5/014; G01S 5/015; G01S 5/016; G01S 5/017; G01S 5/018;
(Continued)

(56) References Cited

U.S. PATENT DOCUMENTS

2008/0232286 A1* 9/2008 Habetha ............ H04W 52/0216
370/311

FOREIGN PATENT DOCUMENTS

| CN | 105163386 A | 12/2015 |
|---|---|---|
| CN | 105489046 A | 4/2016 |
| EP | 2151696 A1 | 2/2010 |
| JP | 2009140644 A | 6/2009 |
| JP | 2013179382 A | 9/2013 |
| WO | WO2004051303 A1 | 6/2004 |

(Continued)

OTHER PUBLICATIONS

Radhakrishnan, Meera, et al. "Smartphones and ble services: Empirical insights." 2015 IEEE 12th International Conference on Mobile Ad Hoc and Sensor Systems. IEEE, 2015. (Year: 2015).*
(Continued)

*Primary Examiner* — Sharad Rampuria

(57) ABSTRACT

A beacon is provided comprising a processor circuit configured to, in dependency on an occupancy signal, switch the radio circuit mode to active mode and periodically transmit the localizing beacon signal through the radio circuit, or switch the radio circuit mode to reduced-energy mode and reduce transmitting of the localizing beacon signal.

17 Claims, 10 Drawing Sheets

(58) Field of Classification Search
CPC .......... G01S 5/019; G01S 5/02; G01S 5/0244; G01S 5/0246; G01S 5/0249
See application file for complete search history.

(56) References Cited

FOREIGN PATENT DOCUMENTS

| WO | WO2010034932 A1 | 4/2010 | |
|----|----|----|----|
| WO | WO-2015104199 A1 * | 7/2015 | ............ H04W 64/00 |
| WO | WO2015104199 A1 | 7/2015 | |

OTHER PUBLICATIONS

Bianchi, Valentina, Paolo Ciampolini, and Ilaria De Munari. "RSSI-based indoor localization and identification for ZigBee wireless sensor networks in smart homes." IEEE Transactions on Instrumentation and Measurement 68.2 (2018): 566-575 (Year: 2018).*

Getting Started With Ibeacon, Version 1.0, Jun. 2, 2014 (11 Pages).

"Beacon Technology. The Future's Bright?" One Iota—Specialists in Multi-Channel Retail Technology, http://www.itsoneiota.com/beacon-technology-the-futures-bright/, Posted on Jun. 1, 2015 (4 Pages).

Galen Gruman, "What You Need to Know About Using Bluetooth Beacons," Apple's Ibeacons Technology is Merely the Start of a New Approach to Location-Aware Apps, http://www.infoworld.com/article/2608498/mobile-apps/what-you-need-to-know-about-using-bluetooth-beacons.html, Infoworld, Jul. 22, 2014 (6 Pages).

Crestron Pinpoint, Crestron Electronics, Inc. Product Catalog, http://www.crestron.com/products/line/room-scheduling-workflow-optimization-wireless-presentation-proximity-detection, Feb. 17, 2016 (6 Pages).

* cited by examiner

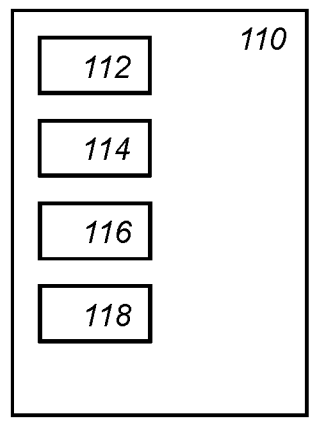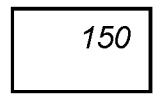
Fig. 1a
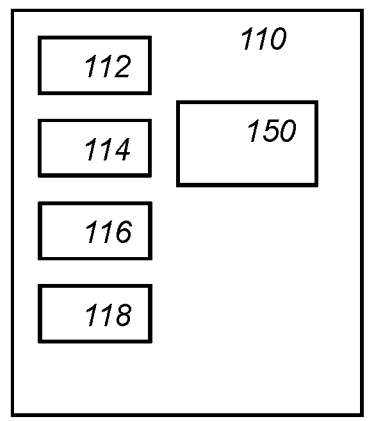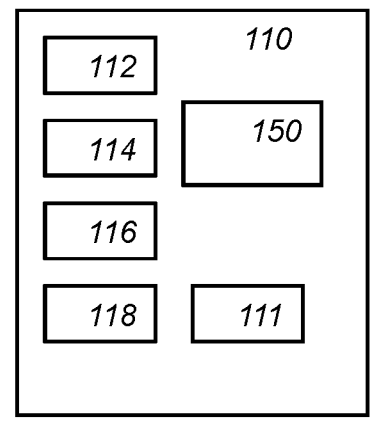
Fig. 1b  Fig. 1c

ELECTRONIC BEACON FOR A LOCALIZATION SYSTEM

CROSS-REFERENCE TO PRIOR APPLICATIONS

This application is the U.S. National Phase application under 35 U.S.C. § 371 of International Application No. PCT/EP2017/068666, filed on Jul. 24, 2017, which claims the benefit of European Patent Application No. 16182991.6, filed on Aug. 5, 2016. These applications are hereby incorporated by reference herein.

FIELD OF THE INVENTION

The invention relates to an electronic beacon, a control device, a localization system, an electronic beacon method, a control method, and a computer readable medium.

BACKGROUND

Location based services are increasingly used. For outdoor applications, such as maps and navigation on a mobile phone, the current location of the mobile phone is used to provide the service. For example, outdoors application may use a GPS receiver to obtain coordinates.

Also indoors, there is an increasing desire to have localization information available, e.g., on mobile devices such as mobile phones. The indoor localization can be used for applications ranging, e.g., from indoor navigation to provide contextual services. For example, in a museum an application may provide context specific information depending on the current location of the mobile device; for example, the information may relate to a painting that is currently close to the device. For example, in a shop an application may provide information depending on the current location of the mobile device; for example, the information may relate to merchandise that is close to the current location of the mobile device.

One way to provide indoor localization is to use a localization system comprising multiple beacons. A beacon is an electronic transmitter placed at a known location, which transmits a periodic radio signal with limited information content, e.g. its identification or location. Beacons provide a low-powered, low-cost transmitter that can help nearby devices determine their location. There are several types of beacons available, based on a number of wireless transmission technologies, e.g., Wi-Fi, ZigBee and Bluetooth. In particular, a beacon may use Bluetooth low energy (BLE), also known as Bluetooth 4.0 or Bluetooth Smart.

In practice, beacons are often simple devices powered by battery with a finite battery life. At some point the battery in the beacon has to be replaced. For example, in practical localization systems a periodic maintenance round is scheduled to replace beacon batteries. Maintenance costs could be reduced if the battery life of beacons could be extended.

Another drawback of current beacon technology is that they increase the RF noise level. To get a high quality localization system multiple beacons are needed. Accurate localization may use multiple beacons to estimate a current location. For example, trilateral localization may be used. Some applications use even more than 3 beacon signals to estimate a location of the beacon receiver. Moreover, as the beacon signal may not penetrate evenly—or at all—throughout a building, multiple beacons may have to be scattered throughout a building. For example, in some localization systems, a beacon may be installed for each office, with multiple beacons for large open plan offices, corridors and the like. All of these beacons transmit wireless signals interminably which leads to an increase in the RF noise level. Potentially this decreases the performance of other wireless applications.

SUMMARY OF THE INVENTION

There is a desire to address these problems and other problems identified herein. The beacon defined in the claims switches a radio circuit mode to active mode to periodically transmit the localizing beacon signal through the radio circuit, or switches the radio circuit mode to reduced-energy mode to reduce transmitting of the localizing beacon signal, in dependency on the occupancy signal. In this way both the power use of the beacon is reduced and the beacon's contribution to the RF noise is reduced. On the other hand, the quality of the localization system is not or little impacted as the reduction of transmitting of the localizing beacon signal depends on an occupancy signal so that occupied areas continue to have access to the localization signal, e.g., to obtain localization services.

In an embodiment, a processor circuit is configured with a first repetition rate and a second repetition rate, the processor circuit transmitting the localizing beacon signal at the first repetition rate in the active mode and at the second repetition rate in the reduced-energy mode, the second repetition rate being lower than the first repetition rate. In this way, localization continues to work for stationary objects, while localization for non-stationary objects continues to get localization signals at a higher repetition rate, e.g., a repetition rate sufficient to track the moving object.

A repetition rate is the frequency with which the localizing beacon signal is repeated. This frequency is not to be confused with the beacon transmission radio frequency. With a lower repetition rate, the pauses between transmission are extended to lower energy consumption. Repetition rate may be expressed as a number of transmissions per second, or as the time between two subsequent transmissions, etc.

The beacon may be used with a control device configured to determine from multiple occupancy sensors an occupancy status of an area surrounding the beacon. Thus even if the beacon is used for localization in an area that is larger than that covered by a single occupancy sensor, the beacon can be switched to and from low-energy mode depending on the larger area.

In an embodiment, the localization system is combined with a connected lighting system, occupancy sensors being shared by both systems.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a beacon, FIG. 1b schematically shows an example of an embodiment of a beacon, FIG. 1c schematically shows an example of an embodiment of a beacon, FIG. 1d schematically shows an example of an embodiment of a beacon and a control computer, FIG. 1e schematically shows an example of an embodiment of a localization system, FIG. 1f schematically shows an example of an embodiment of a beacon and a control computer, FIG. 2a schematically shows an example of an embodiment of beacon, occupancy sensor and luminaire, FIG. 2b schematically shows an example of an embodiment of beacon, occupancy sensor and luminaire, FIG. 2c schematically shows an example of an embodiment of a connected lighting system, FIG. 2d schematically shows an example of an embodiment of a connected lighting system, FIG. 2e schematically shows an example of an embodiment of a connected lighting system, FIG. 3a schematically shows an example of an embodiment of an office light plan FIG. 3b schematically shows a detail of FIG. 3a.

Figure 1D:
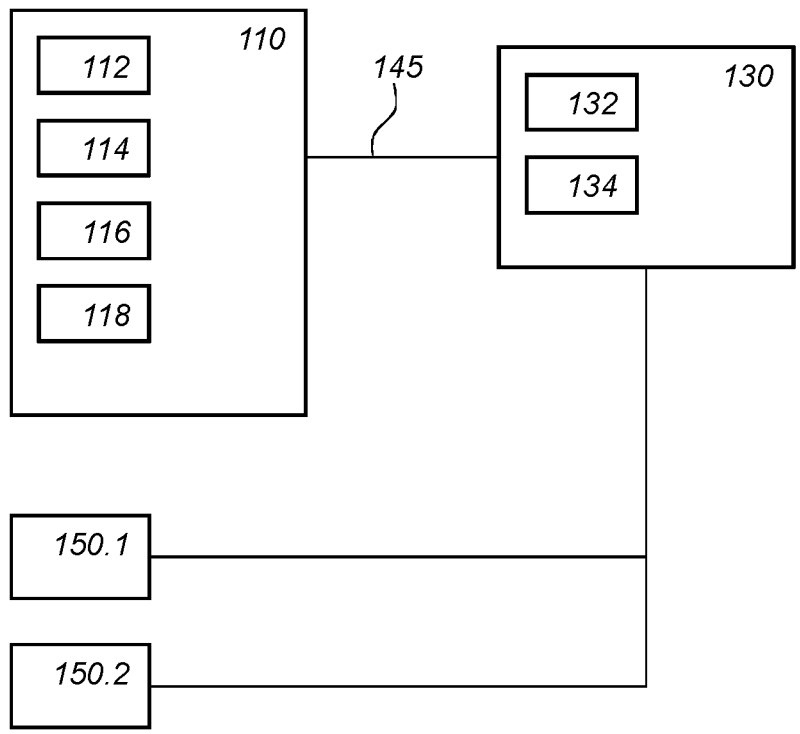

LIST OF REFERENCE NUMERALS, IN FIGS. 1a-1f, 2c-2e 100 a localization system
110 a beacon
111 a battery compartment
112 a radio circuit
114 a beacon memory
116 an input interface
118 a processor circuit
120 an electronic luminaire
122 a communication interface
128 a processor circuit
130 a control computer
132 a communication interface
134 a processor circuit
136 a storage
150 an occupancy sensor
150.1-4 an occupancy sensor
161 open plan office
162 meeting room

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

FIG. 1a schematically shows an example of an embodiment of a beacon 110. Beacon 110 can form a localization system together with a number of other beacons of the same or a similar design. For example, the beacons may be distributed around a building.

Beacon 110 comprises a beacon memory 114. Beacon memory 114 is arranged to store a beacon identifier. In an embodiment, the beacon identifier is unique for a localization system. Beacon 110 comprises a radio circuit 112. Radio circuit 112 is arranged to transmit a wireless localizing beacon signal. The wireless localizing beacon signal comprises the beacon identifier stored in beacon memory 112. Beacon 110 is arranged to periodically repeat the localization signal. Beacon 110 may comprise a processor circuit configured to generate the localization signal and to periodically repeat transmission of the localization signal over radio circuit 112. Radio circuit 112 may comprise an antenna.

A beacon based localization system allows a device with a beacon receiver, e.g., a mobile phone, to obtain its position on a small scale. A beacon based localization system is in particular suited where GPS reception is poor, e.g., indoors. The indoor location may be used, e.g., to deliver contextual content to users based on location. For example, information what is at a specific location may be obtained separately as a wireless service as requested by a mobile app. A localization system may be the backbone for many location-based services.

Beacons may be based on different types of wireless technology. For example, beacons 110 may be a Bluetooth, Zig-Bee, or Wi-Fi beacon. In an embodiment, beacon 110 uses Bluetooth Low Energy. Other possible beacon types include BLE, WiFi, WiMax, cellular triangulation or LoRa (e.g. for street lighting). The received beacons may be a mixture of different type beacons.

Beacons typically operate alone and may be battery powered which means they have to be serviced every couple of years. Typically, beacons are not part of a network, and are not able to send push-messages to receiving devices. Neither are beacons equipped for collecting user data or for storing these. In an embodiment, a beacon solely sends information about its identity. The beacon identifier distinguishes the beacons in the localization system from each other.

Often beacons are installed in a grid to give good location coverage over the whole space. Advantageously, beacons are placed in the ceiling. With this placement they are located with a good line of sight which is beneficial for reception coverage.

In further developed embodiments, beacon receivers are positioned at different heights to obtain increased resolution. Beacon receivers at different heights may be used to localize a beacon receiver in three dimensions. In a yet further developed embodiment, a beacon receiver comprises a directive antenna. A directive antenna allows determining a direction from which a beacon signal came. Having a direction in addition to a signal strength allows obtaining a more accurate position.

In an embodiment, a localization signal comprises a constant preamble followed by the beacon identifier. The beacon identifier may be a UUID (Universally Unique Identifier), and a Major and Minor value. For example, the UUID may be 16 bytes long, Major and Minor are each 2 bytes long. Together these form an ID for the beacon. In an embodiment, the UUID is the same for all beacons in the same localization system, while the Major and Minor values vary for each beacon. A localization signal may further comprise a signal power value. For example, it may represent the RSSI value (Received Signal Strength Indication) measured at 1 meter from the beacon. The value of this value may be used in calculating a location from received signal strengths. The signal power value of the beacon may be known at the control computer. For example, the control computer may comprise a table associating beacon identifier to signal power value. The signal power value may be the same for all beacons in the localization network.

The range of the localization signal of a beacon depends on the transmission power of the beacon. This may be the same for all beacons, or may be set differently for some beacons. Note that reception of a beacon localization signal depends on environmental factors. The localization signal is repeated each time period. The time period may be set smaller if frequent updates in localization are needed, e.g., if the localized object moves quickly. More frequent repeats of the localization signal use more power. For example, a repeat interval may be set between, e.g., 100 ms and 1 second, e.g., 200 ms.

Computing a location from received localizing beacon signals may be done in a variety of ways. For example, in a simple embodiment, one may simply conclude that the beacon receiver is not too far removed from the beacons that it can receive, e.g., it is within range. In a more advanced embodiment, the intersection of the ranges of the received beacons may be determined, and it can be concluded that the beacon receiver is located in or near the intersection. For example, the beacon identifier may comprise the beacon location, say a room number.

Better estimates of location can be made by recording the received signal strength of the localization signal. In an embodiment, a beacon receiver is arranged to measure the signal strength of the localization signal, and optionally, also a signal power value received in the localization signal. The signal power value may be used with the signal strength indication in estimating a distance between the beacon receiver and the beacon.

From the signal strength indication an estimated distance may be computed. In an embodiment, the estimated distance may be rounded to a small number of categories, e.g., unknown, immediate below 50 cm, near up to 2 m and far up to 30 m.

From the information on the received beacon identifiers, and possibly the signal strength indications, a location of the beacon receiver can be estimated using various algorithms known in the art. For example, a trilateral estimation may be used, comprising estimated the distance between the beacon receiver and at least 3 beacons using the received signal strength. An example is given in the paper "Algorithms for Location Estimation Based on RSSI Sampling", by Papamanthou et al.

Localization may be done in the same device that comprises the beacon receiver, e.g. a mobile phone. Localization may also be offered as a service. For example, an electronic device comprising a beacon receiver may be configured to record beacon identifiers that are received and their associated signal strength, and forward this information to a computer offering a localization service.

Figure 3A:
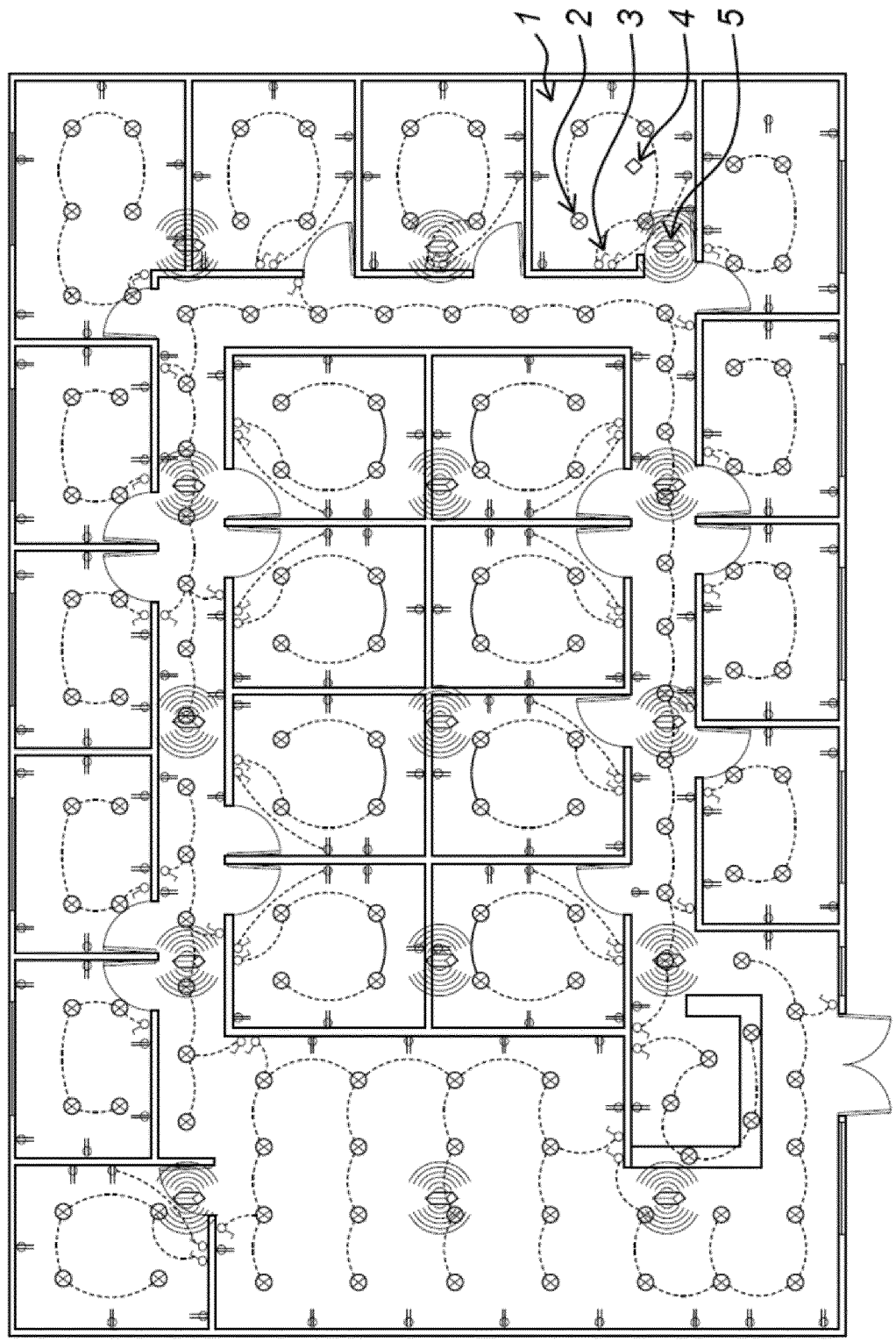
Figure 3B:
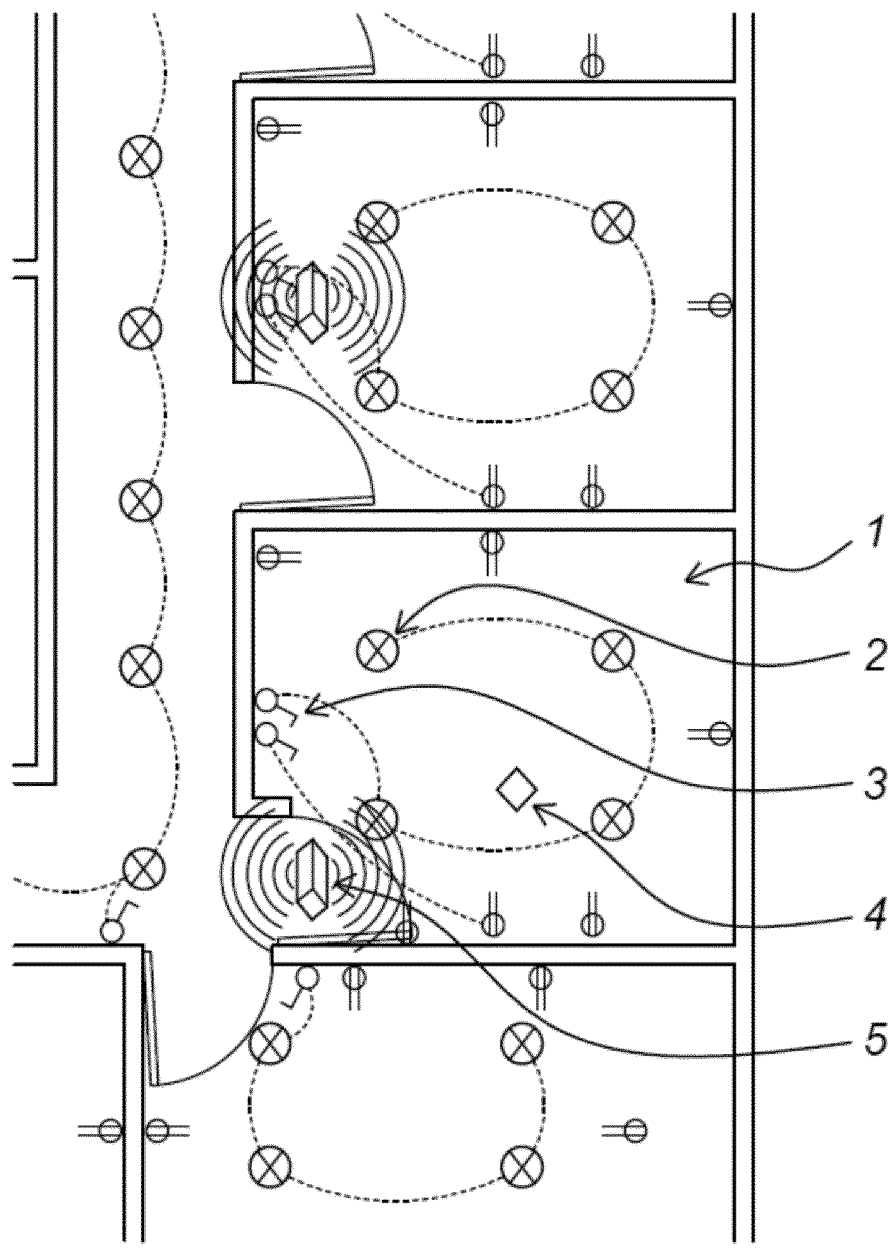

FIG. 3a schematically shows an example of an embodiment of an office light plan a localization system. FIG. 3b schematically shows a detail of FIG. 3a. Shown in FIGS. 3a and 3b are beacons 5, arranged in a grid. For example, the lighting plan shown in FIG. 3a may be an office space comprising a number of office rooms 1. In the office room 1, a group of lamps 2 are controlled by manual switches 3 and/or sensors 4. In embodiment, one or more of the assets like sensors 4, manual controls 3 and light sources 2 comprise a beacon receiver as shown in FIG. 1a. The connected lighting system of FIG. 3a comprises a control computer, which is not shown in FIG. 3a. A device with a beacon receiver may locate itself using the beacons 5.

In an embodiment, sensor 4 is an occupancy sensor arranged to determine occupancy of an area surrounding the occupancy sensor. For example, the occupancy sensor may be an infrared sensor, or a movement sensor, etc. For example, the occupancy sensor is arranged to generate an occupancy signal if the occupancy sensor detects occupancy or no occupancy of an area surrounding the occupancy sensor. The occupancy signal may be used to control the luminaires 2. This may be done directly, e.g., by a local network of a local network, or via the control computer. For example, processor circuit 134 of control computer 130 may be configured to determine from one or more occupancy sensors an occupancy status of an area surrounding the luminaire 2, e.g., office 1. If control computer 130 determines that office 1 is occupied, then control computer may send a control message to the luminaires 2 to switch them on. Possibly, the decision to turn a luminaire on may be more complicated and also involve day light sensors, and (wall) switches or other local controls, etc.

Figure 4:
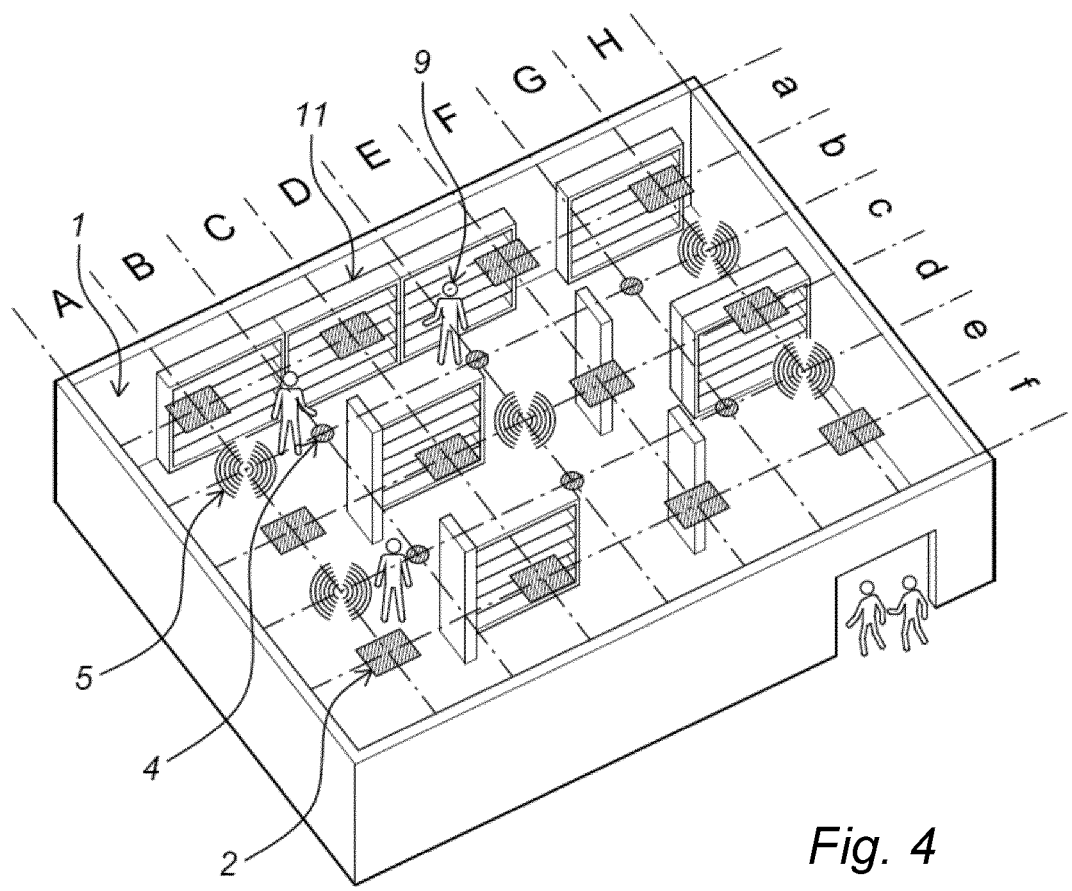
FIG. 4 schematically shows an example of an embodiment of a library in a perspective view, FIG. 5a schematically shows an example of an embodiment of a beacon method, FIG. 5b schematically shows an example of an embodiment of a beacon method, FIG. 5c schematically shows an example of an embodiment of a beacon method, FIG. 6 schematically shows an example of an embodiment of a control method, FIG. 7a schematically shows a computer readable medium having a writable part comprising a computer program according to an embodiment, FIG. 7b schematically shows a representation of a processor system according to an embodiment.

FIG. 4 schematically shows an example of an embodiment of a library in a perspective view. Here beacon technology is used to support people searching for specific books by means of multiple beacons 5 installed in the ceiling distributed over the space. FIG. 4 shows a room 1 with a grid of light sources 2 in the ceiling and five beacons 5. People 9 are moving around and are supported to reach a shelf 11 where a certain book is located. For example, a mobile phone of people 9 may comprise a beacon receiver to determine a location in the library. Using the location of the mobile phone a signal may be computed to guide the people in the correct direction. For example, the signal could be a map in which the desired location and the current location of the mobile phone are indicated. Similar applications are in shops, storing spaces or magazines.

For example, at present, as shown in FIG. 4, no one is present near the beacon shown in FIG. 4 at the intersection of row d, e and columns G,H. The persons shown in FIG. 4 can locate themselves, e.g., their mobile phones, using the other beacons. Accordingly, in an embodiment, the beacon in the lower right corner of FIG. 4 may switch to low-energy mode and reduce or suspend the transmission of its localization signal.

An advantage of the lighting and localization systems in FIGS. 3a and 4 is that occupancy sensors are used to switch beacons into low-energy mode when they are not required to localize moving objects, e.g., people. If the tracking of moving objects is the only requirement of the localization system, the unneeded beacons may be turned off, e.g., switched to sleep mode. If tracking of slow-moving or stationary objects is a use of the localization system, then the unneeded beacons may be switched to a lower repetition rate of the transmissions.

Returning for FIG. 1a. The beacon 110 makes use of an occupancy sensor to optimize beacon power consumption. Occupancy sensors are also vacancy sensors, and presence detectors, etc.

As discussed, beacon 110 comprises a radio circuit 112 arranged to transmit a wireless localizing beacon signal, and a processor circuit 118 configured to generate the localizing beacon signal. Processor circuit 118 is also configured to cause the localizing beacon signal to be transmitted through the radio circuit. For example, beacon 110 may comprise a beacon memory 114 for storing the beacon identifier which may be included in the localizing beacon signal. Beacon memory 114 may, e.g., be a non-volatile memory such as a flash memory.

Beacon 110 also comprises an input interface 116 arranged to receive an occupancy signal indicating an occupancy status of an area surrounding the beacon. The occupancy signal may be received from an occupancy sensor or from a control computer. In the latter case the occupancy signal may be aggregated from the inputs of multiple occupancy sensors.

Processor circuit 118 is configured to maintain a radio circuit mode for the radio circuit, the mode being one of an active mode and a reduced-energy mode. For example, the radio circuit mode may be kept in a memory of beacon 110, e.g., in the beacon memory. This may be a volatile memory.

Processor circuit 118 maintains the radio circuit mode on the basis of the occupancy signal, and uses the radio circuit mode to determine how much energy to invest in transmitting the localization signal. Processor circuit 118 is configured to, in dependency on the occupancy signal, switch the radio circuit mode to active mode and periodically transmit the localizing beacon signal through the radio circuit, or switch the radio circuit mode to reduced-energy mode and reduce transmitting of the localizing beacon signal.

For example, if the occupancy signal indicates that the area surrounding the beacon is not occupied, e.g., if no humans are detected, then the mode may be switched to reduced-energy mode. Processor circuit 118 need not switch immediately, but may wait for a time period before switching. If occupancy is detected in the time period, then processor circuit 118 does not switch to reduced energy mode. This avoids that brief lapses in detection of humans immediately cause the quality of localizations to be reduced.

For example, if the occupancy signal indicates that the area surrounding the beacon is occupied, e.g., if humans are detected, then the mode may be switched to active mode. Typically, processor circuit 118 will switch immediately in this case.

FIG. 1a shows an occupancy sensor 150. Occupancy sensor 150 is arranged to determine occupancy of an area surrounding the occupancy sensor. Several technologies are available for occupancy sensors, e.g., passive infrared occupancy sensors, ultrasonic occupancy sensors, microwave occupancy sensors, audio detection occupancy sensors, etc. An occupancy sensor may be a motion sensor. An occupancy sensor may also be based on dongles carried by humans. Presence of the dongle may be detected wirelessly, e.g., by detecting an RFID in the dongle. In an embodiment, the occupancy sensor detects an electromagnetic radiation indicative of a human presence. Hybrid occupancy sensors combining two or more of these technologies are also possible. For example, in an embodiment an occupancy sensor combines passive infrared (PIR) with ultrasonic detection.

Occupancy sensor 150 is arranged to generate an occupancy signal indicating if the occupancy sensor detects occupancy or no occupancy of an area surrounding the occupancy sensor. Occupancy sensor 150 may be an independent device that may be installed in a building, say in an office. In this case, occupancy sensor 150 may comprise a communication interface arranged to communicate over a digital network, e.g., directly to beacon 110; and a processor circuit. Occupancy sensor 150 may also be integrated in another device, in which case the host device may perform these tasks for the occupancy sensor.

There are a number of different ways in which processor circuit 118 can reduce energy consumption of beacon 110.

In an embodiment, the processor circuit is configured with a first repetition rate and a second repetition rate. For example, the first and second repetition rate may be stored in a memory of beacon 110, say memory 114. For example, the first and second repetition rate may be coded in software of beacon 110 and executed by processor circuit 118.

The processor circuit transmits the localizing beacon signal at the first repetition rate in the active mode and at the second repetition rate in the reduced-energy mode. The second repetition rate being lower than the first repetition rate. For example, in an embodiment, the first repetition rate is one localization signal transmission per 200 ms, the second repetition rate is once per 500 ms. For example, in an embodiment, the first repetition rate is once per 350 ms, the second repetition rate is once per 700 ms. In an embodiment, the first repetition rate is less once than 450 ms, and the second repetition rate is more than once per 450 ms. In an embodiment, the second repetition rate is at most 50% of the first repetition rate.

An advantage of these embodiments is that tracking of persons, e.g., in a store, is not impeded since when persons are present a high beacon sending repetition rate is used. However, objects that are stationary for longer periods and are not detected by the occupancy sensors can still continue to use localization functions. Tracking of such objects would be impeded, but as they are not moving this is not a problem.

In an embodiment, a beacon in energy reduction mode reduces the signal strength of the localization signal, optionally together with reducing the repetition rate with which the localization signals are transmitted. A reduced signal strength means that the signal is primarily useful for nearby objects, e.g., for tracking stationary objects. Note that the localization signal may include a signal strength indication so that distance estimation can take into account the reduced strength of the localization signal.

In an embodiment, the radio circuit is arranged with a sleep/wake input (not separately shown). A sleep/wake input may be implemented as a signal circuit between radio circuit 112 and processor circuit 118. A sleep/wake input may be implemented as a memory element, e.g., an address in a memory, a register etc., that is accessible both by radio circuit 112 and processor circuit 118.

Radio circuit 112 can receive a sleep signal over the sleep/wake input. Processor circuit 118 is arranged to switch radio circuit 112 into a low-energy sleep state. When radio circuit 112 enters sleep state it stops transmission, in particular it stops transmission of the localization signals, this will reduce power consumption. Additional power reduction may be achieved in other ways. For example, part of radio circuit 112, e.g., a transmission and/or amplification part may be powered off in the sleep state. For example, processor circuit 118 may be configured to generate a mode change signal to cause the radio circuit to enter sleep mode.

Radio circuit 112 is arranged to also receive a wake signal over the sleep/wake input, even while in sleep state. If the wake signal is received, the radio circuit returns to a high-energy operational state. The radio circuit 112 can be used again for transmission of localization signals.

Processor circuit 118 is configured to send the wake signal to the radio circuit sleep/wake input when it switches the radio circuit mode to active mode, and to send the sleep signal to the radio circuit sleep/wake input when it switches the radio circuit mode to reduced-energy mode. An advantage of this embodiment is that power is reduced more, on the other hand all localizations using this particular beacon are hampered.

A further advantage of reducing the number of localization messages is that the RF noise level reduces.

FIG. 1b schematically shows an example of an embodiment of a beacon. The beacon of FIG. 1b is similar to FIG. 1a, but has an integrated occupancy sensor 150. Beacon 110 may use sensor 150 to directly receive an occupancy signal. In this case the input interface, is an internal interface. Beacon 110 may be extended to report the occupancy signal of the integrated occupancy signal to other devices, e.g., a luminaire in the vicinity, a control computer, etc.

FIG. 1c schematically shows an example of an embodiment of a beacon. The beacon of FIG. 1c is similar to FIG. 1b. Shown in the beacon of FIG. 1c is a battery compartment 111. An advantage of embodiments of beacons according to the present invention is that they reduce power consumption, especially in situation where occupancy is absent for longer stretches of time. This means that a battery operated beacon will last longer. The power reducing properties of reducing transmission of localization signals may be combined with other power reducing measures. For example, other transmissions of the network may be temporarily suspended or reduced. For example, a beacon that is switched to sleep mode for 14 hours during workdays, and 24 hours during the weekend has a reduction in the number of transmissions of 70%. This number can increase even further when taking into account that the beacon may sleep during working hours as well. For some beacons, e.g., located in a less frequented storage area, the decrease in transmission may near a 100%.

FIG. 1d schematically shows an example of an embodiment of a beacon and a control computer.

Control computer 130 comprises a communication interface 132 arranged for communicating, at least, with the beacons in the localization system, and in particular with beacon 110. Communication interface 132 may be arranged to communicate over a digital computer network; for example, the computer network may comprise a wireless network, e.g., Wi-Fi or ZigBee, and/or a wired network, e.g., Ethernet, Power over Ethernet, etc. Communication interface 132 is used both as an input interface and as an output interface. In an embodiment, the input and output interface may be separate interfaces though. When used as in input interface, communication interface 132 is arranged to receive occupancy signals from multiple occupancy sensors. Shown are occupancy sensors 150.1 and 150.2. When used as an output interface, communication interface 132 is arranged to send an occupancy signal to a beacon, in particular to beacon 110.

The multiple occupancy sensors, e.g., the shown sensors 150.1 and 150.2 cover an area larger than that of a single occupancy sensor. It is desired that, if any of the areas covered by occupancy sensors 150.1 and 150.2 is occupied that beacon 110 continues to send localization signals.

Control computer 130 comprises a processor circuit 134. Processor circuit 134 is arranged to execute computer program instructions stored in a memory of control computer 130. Processor circuit 134 is configured to determine from the multiple occupancy sensors an occupancy status of an area surrounding the beacon. For example, the area may be the union of the areas covered by the multiple occupancy signals. For example, assuming an occupancy signal is a binary '1' for occupancy and a binary '0' for non-occupancy, determining a combined occupancy signal from multiple occupancy signals may be a logic or-functions. For example, if any one of the multiple occupancy signals indicates that the area surrounding the corresponding occupancy sensor is occupied the combined occupancy signal may indicate occupancy, but if all of the multiple occupancy signals indicate non-occupancy, the combined occupancy signal determined by control computer 130 may indicate non-occupancy.

Once control computer 130 has determined the appropriate occupancy status of the area covered by the multiple occupancy sensors, then control computer 130 may generate an occupancy signal indicating the occupancy status of an area surrounding the beacon and transmitting said occupancy signal to the beacon.

In an embodiment, control computer 130 is also a control computer for other building automation functions. In particular, control computer 130 may be a control computer for a connected lighting system. In the latter case, the occupancy sensors may be used for controlling the lighting network. For example, if an area is not occupied the lights in that area need not be turned on. Lighting decision may use other sensor input to determine if the lights are to be turned on, and possibly also to what dimming level. Examples include day light sensors and manual switches, e.g., wall switches.

Figure 1E:
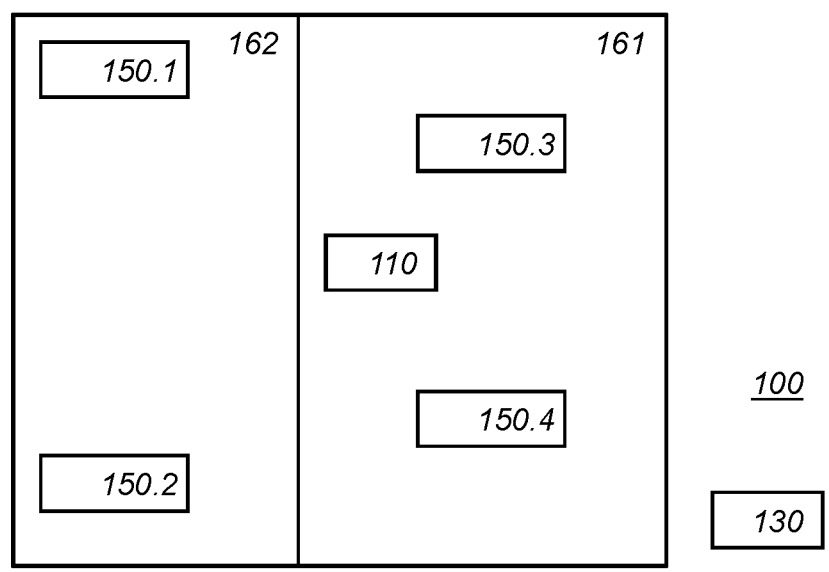
Figure 1F:
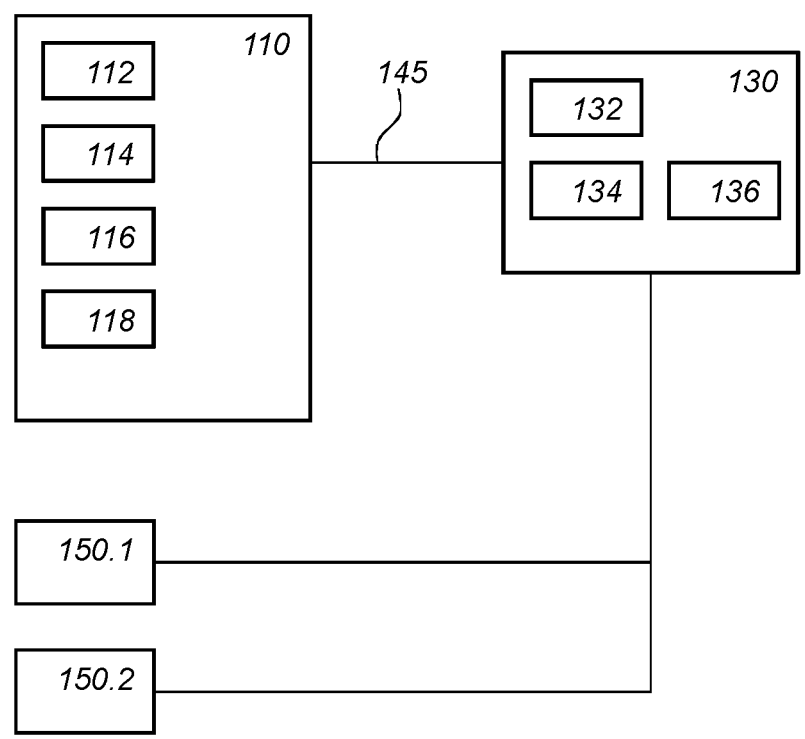

FIG. 1e schematically shows an example of an embodiment of a localization system, that may use the beacon 110 and control computer 130 of FIG. 1d. Shown in FIG. 1e is a map of part of an office building. Shown is a meeting room 162 and an open plan office 161. Located in office room 161 is beacon 110. Beacon 110 may be part of a localization network that includes a number of additional beacons. Using the beacons devices, mobile devices can determine their location by estimating their distance to the beacons, or at least to a number of the beacons. Distance to a beacon may be estimated by measuring the signal strength of the wireless localization signal transmitted from the beacon; shown are sensors 150.1, 150.2, 150.3, and 150.4. The localization system may comprise additional sensors that are not shown. In this example, the additional sensors may be used to control beacons and lighting different from the lighting and beacon in rooms 161 and 162.

For example, control computer 130 may have been programmed to turn on all lights in meeting room 162 if any one of occupancy sensors 150.1 and 150.2 indicates occupancy.

In a meeting room it is generally undesirable if only part of the lights turn on. Control computer 130 may be programmed to turn on only part of the lights in open plan office 161 if occupancy sensor 150.3 indicates occupancy but occupancy sensor 150.4 does not, and vice versa.

However, in this example, beacon 110 has a function in localization throughout office 161 and meeting room 162 (possibly with other beacons not shown in FIG. 1*e*). In this case control computer 130 is arranged to receive the occupancy signals from occupancy sensors 150.1-150.4 in addition to determining the appropriate lighting status of the luminaires in room 162 and office 161, and controlling the luminaires correspondingly, control computer 130 also computes an occupancy signal for beacon 110. For example, in this case the occupancy signal for beacon 110 may be the OR function of the occupancy signals of occupancy sensors 150.1-4. This has the advantage that people who work in room 162 do not notice a degradation of localization functionality. Even if no-one is in office 161, and all the lights are off, but people continue to use the meeting room 162 localization will be as usual. Once all occupancy in areas 161 and 162 have ceased will control computer 130 switch beacon 110 to a low-energy mode. People using the building outside of rooms 161 and 162 may notice that beacon 110 sometimes disappears but localization is not impacted as those parts of the regions have closer beacons that will be used for localization.

In an embodiment, the localization function, e.g., of a localization service or of a mobile device, etc., may be configured to only use received beacons. In this way, it is avoided that a non-transmitting beacon 110 is interpreted as a very large distance to beacon 110.

It is not required that the relationship between the areas covered by the occupancy sensors and the area in which a beacon can be received match up very precisely. So-long as a sufficient number of beacons remain for localizations further away from a beacon, it does not matter if a beacon switches to low-energy mode, even if some occupancy remains further away from the beacon.

In an embodiment, a control computer comprises a mapping, say in the form of a table, between beacons and corresponding occupancy sensors. For example, the table may look like this:

| Beacon | Occupancy sensors |
| --- | --- |
| Beacon #123252 | Sensors #2323, #4242, #9938 |
| Beacon #428822 | Sensors #9921, #2234, #4242 |
| ... | ... |

The numbers (#) referring to identity numbers of the beacons and sensors respectively. Note that there may be overlap in the occupancy sensors. That is, a single occupancy sensor may correspond to multiple beacons. Preferably, a beacon can be received in a at least part of the area covered by a corresponding occupancy sensor. A beacon is switched to low-energy mode only if all of the corresponding occupancy sensors report non-occupancy. In an embodiment, each occupancy sensor corresponds to a minimum number of beacons. For example, in an embodiment, the minimum number is 3, 4 or larger. This ensures that occupancy reported by an occupancy sensor causes a minimum number of beacons to wake up and thus guarantee a minimum level of localization quality in the area covered by said occupancy sensor.

Figure if schematically shows an example of an embodiment of a beacon and a control computer 130. The embodiment of figure if further builds on the embodiment of FIG. 1*d*. However, in FIG. 1*f* beacons are switched to active mode in more situations. Control computer 130 of figure if comprises a storage 136 arranged to store occupancy signals from the multiple occupancy sensors. In this way an archive is established of historic occupancy signals. For example, for each occupancy sensors the reported occupancy status may be stored. In an embodiment, the occupancy status is stored at a reduced resolution. For example, if the occupancy sensors report occupancy every second, the storage 136 may store occupancy status every 5 seconds, or even every minute, etc.

Processor circuit 134 is configured to execute a machine learning algorithm for predicting future occupancy signals from the multiple occupancy sensors. The machine learning algorithm can produce a trained model. For example, the machine learning algorithms may be a neural network. The neural network receiving at input nodes the current and some of the past occupancy signals, and possibly additional inputs that may correlate with movement through the building, such as time of day, and an indicator that indicates if this is a work day or not. Some occupancy sensors also report an estimate of the number of people in an area. If so, this may be added as an input to the neural network. At the output nodes of the neural network a prediction is given of the next occupancy signal at the current resolution, say every minute. The neural network can be trained using a neural network training algorithm on the historic data.

Once a trained model is available, it can be used to determine from the multiple occupancy sensors a future occupancy status of an area surrounding the beacon. The model may predict future occupancy signals generated by a sensor. In this case, the beacons are kept in active mode even though normally they would be turned off based on the occupancy sensors in the immediate vicinity. This may be done by generating the occupancy signal indicating the future occupancy status of an area surrounding the beacon and transmitting said occupancy signal to the beacon. As a result, the beacon will anticipate its future requirement. In embodiment, the machine learning algorithm is only used to switch beacon to active in anticipation of people coming and not to switch a beacon to low-energy in anticipation of people leaving.

Instead of a neural network other machine learning algorithms may be used. For example, in an embodiment the support vector machine algorithm is used. This has the advantage that less training material may be needed to get some improvement in the beacon network.

For example, consider the following scenario. Past office hours many of the offices are empty and thus many beacons may have switched to low-energy mode. However, the machine learning algorithm may learn that if some offices are still occupied, these people will probably soon leave as well, and move past the beacons on the way to the exit. In an embodiment, these beacons may be kept in active mode even though the occupancy sensors in their immediate vicinity at present give a non-occupied status. As a result, the people who leave late will not notice an impaired localization service. Once everyone has left, the machine learning algorithm will know that no further occupancy can be expected until opening time. If the machine learning algorithm includes time of day as one of its input, it will learn to activate beacons just before opening time, but only on work days.

Figure 2A:
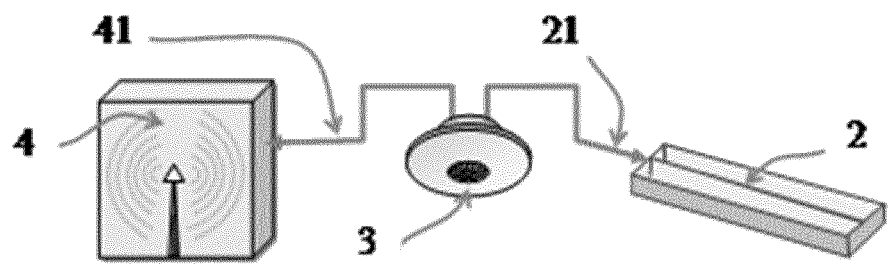

FIG. 2a schematically shows an example of an embodiment of beacon, occupancy sensor and luminaire. A presence detection signal of one or more presence detectors near a beacon is used to control a beacon. This not only reduces power consumption but also improves signal to noise ratio in order to enhance position reading quality and reduces RF noise floor for other wireless applications. As depicted in FIG. 2a, a beacon 4 is controlled by an occupancy sensor 4 through control line 41. The luminaire 2 is also controlled by the occupancy sensor through connection 21. In an alternative embodiment a PLC (power-line) or RF wireless connection might be used between sensor and beacon rather than the wired connection 41. This can beneficially be done by means of the same RF technology as the beacon, e.g., Bluetooth. If the occupancy sensor already incorporates a Bluetooth transceiver this may also be used for controlling the luminaire rather than over the wired connection 21.

Figure 2B:
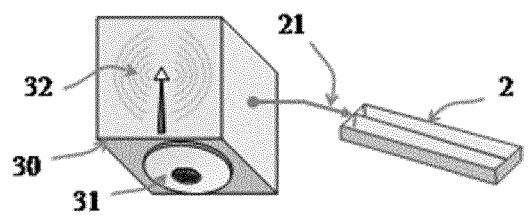

FIG. 2b schematically shows an example of an embodiment of beacon, occupancy sensor and luminaire. In this embodiment, the beacon transmitter is integrated with a presence or movement detector as depicted in FIG. 2b. In this case the presence information can directly be used to control the beacon behavior. In addition, power supply for the sensor and the beacon transmitter may be combined. For example, the beacon transmitter may be connected to and powered from a luminaire. It is also possible to combine occupancy sensor, luminaire and beacon in a single device. In another embodiment in combination with a Power over Ethernet (PoE) lighting system the beacon may also be integrated with a PoE Power Sourcing Equipment (PSE) in one housing or be powered by PoE where Ethernet connectivity is used for the beacon control.

The interface for connecting a beacon may be integrated with a lighting device (like a PSE) and ON/OFF controls may be provided as an additional service to beacon manufacturers.

Figure 2C:
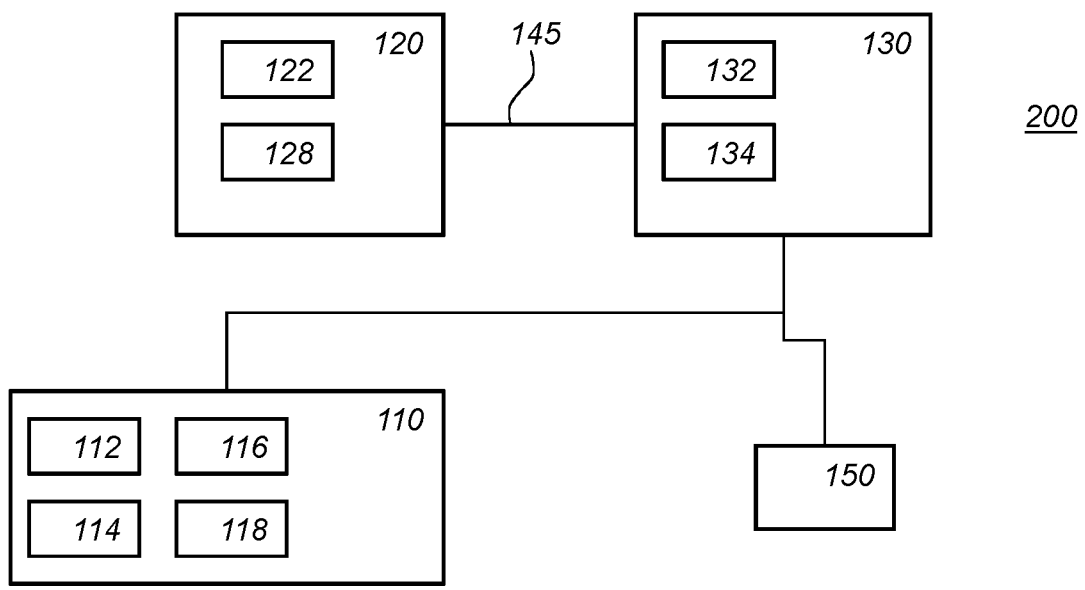

FIG. 2c schematically shows an example of an embodiment of connected lighting system.

Shown in FIG. 2c is a connected lighting system comprising a control computer 130, multiple occupancy sensors (one sensor 500 is shown) and multiple luminaires (one luminaire 120 is shown).

Luminaire 120 comprises a communication interface 122 arranged to communicate with control computer 130 over a digital network 145. Digital network 145 may comprise a wired network, e.g., an Ethernet network, e.g. using one or more power over Ethernet connections (PoE). Digital network 145 may comprise a wireless network, e.g., a Wi-Fi or ZigBee network. Digital network 145 may combine wired and wireless technologies.

Luminaire 120 comprises a processor circuit configured to activate and deactivate a lighting unit of the luminaire dependent upon an occupancy signal indicating an occupancy status of an area surrounding the luminaire.

Processor circuit 134 of control computer 130 receives occupancy signals from the multiple occupancy sensors, and uses it to control both the localization network, e.g., beacon 110, and the luminaires, e.g. luminaire 120. Processor circuit 134 is configured to determine from the multiple occupancy sensors an occupancy status of an area surrounding the beacon, generating an occupancy signal indicating the occupancy status of an area surrounding the beacon and transmitting said occupancy signal to the beacon, and/or determine from the multiple occupancy sensors an occupancy status of an area surrounding the luminaire, generating an occupancy signal indicating the occupancy status of an area surrounding the luminaire and transmitting said occupancy signal to the luminaire. Thus the occupancy sensors are used both to control luminaire and beacons, although the control mapping between sensors and luminaires and sensors and beacons may be quite different. See also FIG. 1e for further elucidation of this possibility.

Figure 2D:
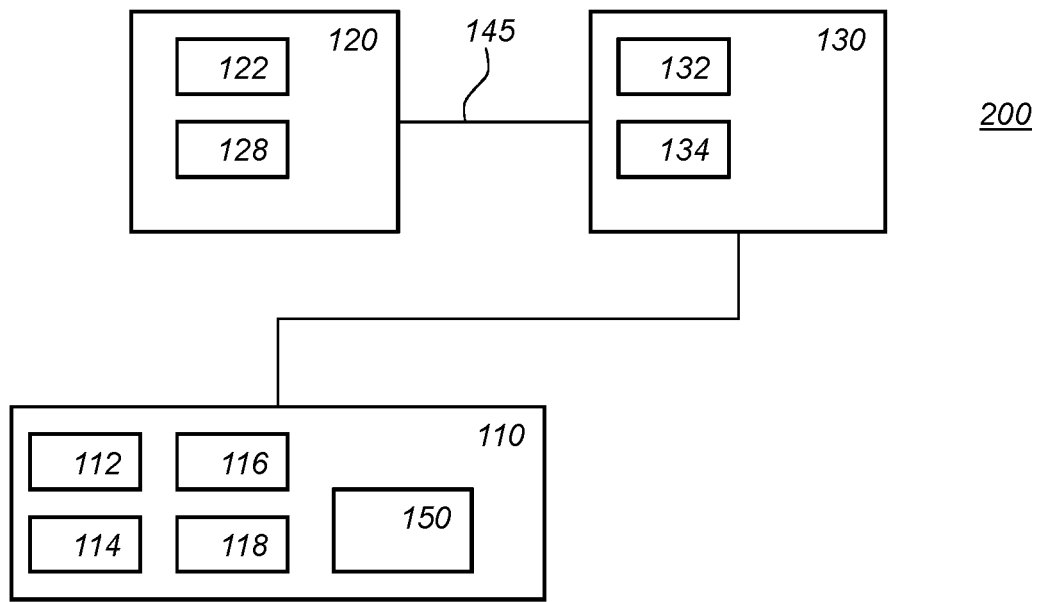

FIG. 2d schematically shows an example of an embodiment of connected lighting system. This embodiment builds upon the embodiment of FIG. 2c, but in FIG. 2d at least one of the occupancy sensors is integrated in a beacon.

Some connected lighting system make use of stand-alone occupancy sensors. In this embodiment, a stand-alone occupancy sensor is combined with a beacon. This is an advantageous combination as both may be battery operated devices. In an embodiment, the occupancy sensor 500 in FIG. 2d directly controls beacon 110, e.g., beacon 110 goes into low-energy mode whenever beacon 500 does not detect occupancy. Occupancy sensor 500 transmits its occupancy signal also to control computer 130, e.g., over ZigBee, which uses it to control one or more luminaires in the system.

In an embodiment, Occupancy sensor 110 transmits its occupancy signal also to control computer 130, e.g., over ZigBee, which uses it to control one or more luminaires in the system, and also to control beacon 500. This embodiment, had the advantage that multiple occupancy sensors can be used to control beacon 110, but has the potential drawback that beacon 110 needs to listen to transmissions more than occupancy sensor 500 alone would.

Figure 2E:
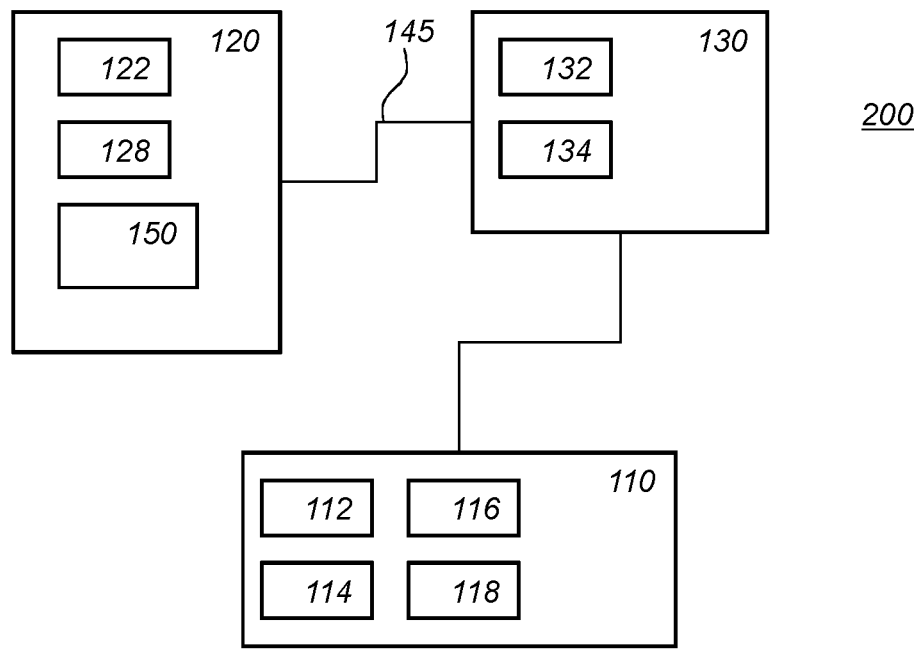

FIG. 2e schematically shows an example of an embodiment of connected lighting system/This embodiment builds upon the embodiment of FIG. 2c, but in FIG. 2d at least one of the occupancy sensors is integrated in a luminaire. An advantage of this system is that occupancy is a powerful determinant of the need for lighting, so many luminaires come equipped with an occupancy sensor anyway. In this way the occupancy sensor can be used to control beacons as well.

In general, an input or output interface may take various forms, such as a network interface to a local or wide area network, e.g., the Internet, etc. The interfaces may be wired or wireless. An input and output interface may be a separate interface, possibly even for different communication mediums. An input and output interface may also be combined into a single communication interface.

Typically, beacon 110, control computer 130, and luminaire 120 each comprise a microprocessor (not separately shown) which executes appropriate software stored at the device; for example, that software may have been downloaded and/or stored in a corresponding memory, e.g., a volatile memory such as RAM or a non-volatile memory such as Flash (not separately shown). Alternatively, the devices may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Figure 5A:
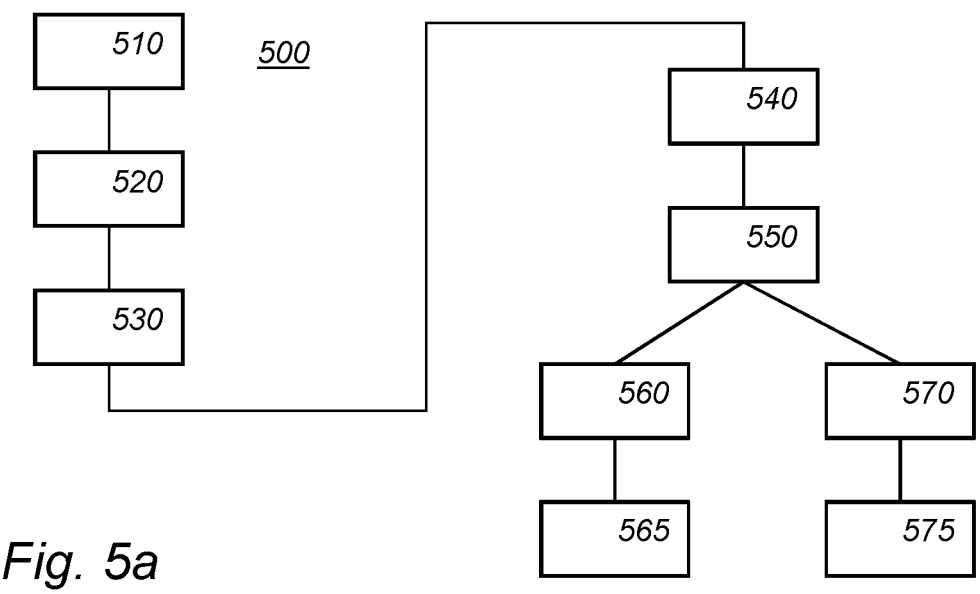

FIG. 5a schematically shows an example of an embodiment of a beacon method 500. Method 500 comprises transmitting 510 a wireless localizing beacon signal, receiving 520 an occupancy signal indicating an occupancy status of an area surrounding the beacon maintaining 530 a radio circuit mode for the radio circuit, the mode being one of an active mode and a reduced-energy mode, generating 540 the localizing beacon signal, and in dependency 550 on the occupancy signal, switch 560 the radio circuit mode to active mode and periodically transmit 565 the localizing beacon signal through the radio circuit, or switch 570 the radio circuit mode to reduced-energy mode and reduce transmitting 575 of the localizing beacon signal.

Figure 5B:
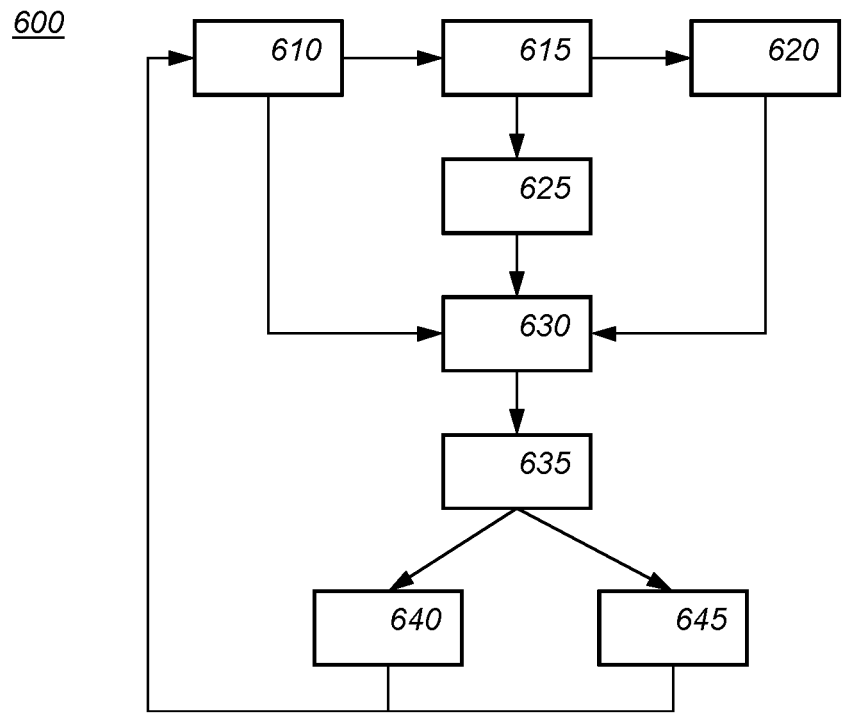

FIG. 5b schematically shows an example of an embodiment of a beacon method 600. Method 600 comprises determining 610 if an occupancy signal has been received. If so the method proceeds at 615, if not the method proceeds to 630 determining 615 if the occupancy signal indicates occupancy or vacancy. If occupancy is detected the method proceeds at 620. If vacancy is detected the method proceeds at 625 setting 620 a radio circuit mode to active mode setting 625 the radio circuit mode to low-energy mode generating and transmitting 630 a localization signal determining 635 the radio circuit mode. If the mode is low-energy the method proceeds to 640, if active the method proceeds to 645 waiting 640 a first wait time, say 600 ms waiting 645 a second wait, say 300 ms, the second wait time being lower than the first wait time.

Both after waiting 640 and 645 the method proceeds at 610.

Figure 5C:
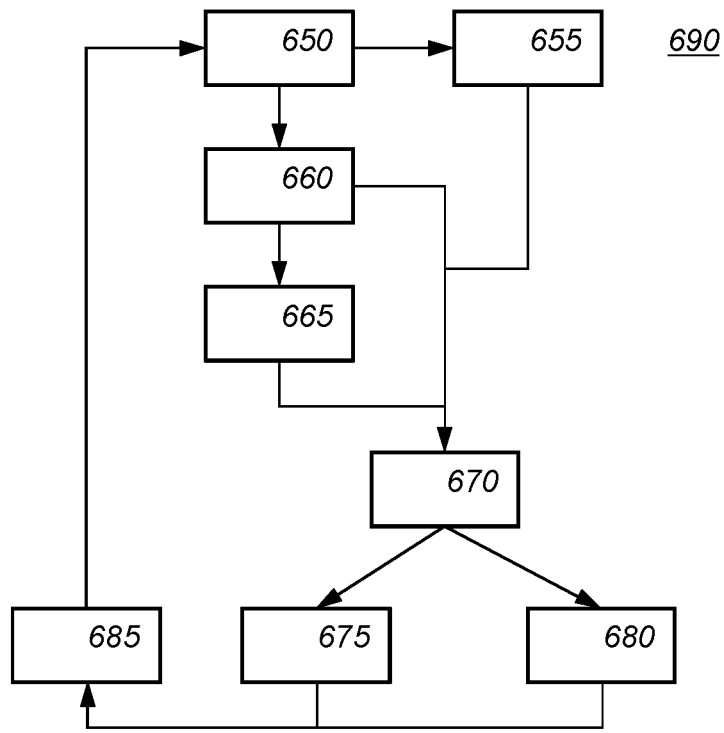

FIG. 5c schematically shows an example of an embodiment of a beacon method 690. This method may be used if occupancy signals are only actively sent if occupancy has been detected. Vacancy is communicated by not sending an active signal. Method 690 comprises determining 650 if an occupancy signal has been received. If so the method proceeds at 655, if not the method proceeds to 660 setting 655 a radio circuit mode to active mode and setting a timer to an occupancy time-out value, say 10 minutes. Continue at 670 determining 660 if the timer expired, and if so continue at 665 and if not at 670 setting 665 the radio circuit mode to low-energy mode determining 670 the radio circuit mode. If the mode is low-energy the method proceeds to 675, if active the method proceeds to 680 waiting 675 a first wait time, say 600 ms waiting 680 a second wait, say 300 ms, the second wait time being lower than the first wait time. Both after waiting 675 and 680 the method proceeds at 685.

generating and transmitting 685 a localization signal, and proceed at 650.

Figure 6:
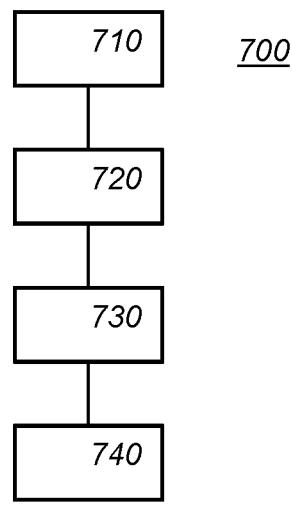

FIG. 6 schematically shows an example of an embodiment of a control method 700 comprising receiving 710 occupancy signals from multiple occupancy sensors, determining 720 from the multiple occupancy sensors an occupancy status of an area surrounding the beacon, generating 730 an occupancy signal indicating the occupancy status of an area surrounding the beacon and transmitting 740 said occupancy signal to the beacon.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 500, 600, 690, and 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
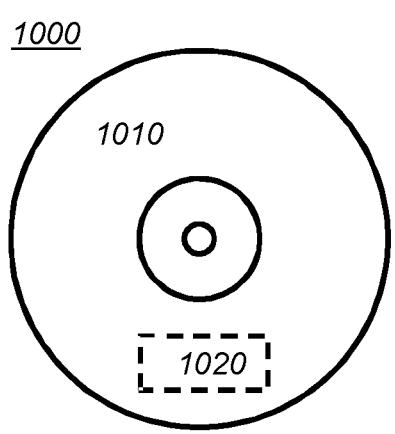

FIG. 7a shows a computer readable medium 1000 having a writable part 1010 comprising a computer program 1020, the computer program 1020 comprising instructions for causing a processor system to perform a beacon or control method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said beacon or control method.

Figure 7B:
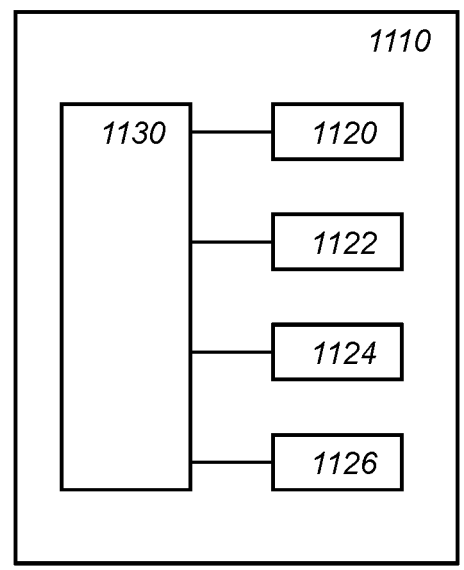

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the beacon or control device may comprise a processor circuit and a memory circuit, the processor being arranged to execute software stored in the memory circuit. For example, the processor circuit of the control circuit may be an Intel Core i7 processor, ARM Cortex-R8, etc. The beacon may comprise a smaller processor circuit, e.g., an ARM M0 Cortex. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic beacon comprising:
    a radio circuit arranged to transmit a wireless localizing beacon signal,
    an input interface arranged to receive an occupancy signal indicating an occupancy status of an area surrounding the beacon; wherein the occupancy status comprises detecting whether a human is detected or not; and wherein the occupancy signal is received from an occupancy sensor or from a control computer, and
    a processor circuit configured to:
        maintain a radio circuit mode for the radio circuit, the mode being one of an active mode and a reduced-energy mode,
        generate the localizing beacon signal, and
        in dependency on the occupancy signal and the occupancy status, switch the radio circuit mode to active mode and periodically transmit the localizing beacon signal through the radio circuit, or switch the radio circuit mode to reduced-energy mode and reduce transmitting of the localizing beacon signal.

2. The electronic beacon according to claim 1, comprising:
    an occupancy sensor arranged to:
        determine occupancy of an area surrounding the occupancy sensor, and
        generate an occupancy signal indicating if the occupancy sensor detects occupancy or no occupancy of an area surrounding the occupancy sensor.

3. The electronic beacon according to claim 1, wherein the input interface is arranged to receive the occupancy signal wirelessly through the radio circuit, the radio circuit being arranged for a wireless communication protocol, such as, Wi-Fi, Bluetooth or ZigBee.

4. The electronic beacon according to claim 1, wherein the radio circuit is arranged with a sleep/wake input to receive a sleep signal, switching the radio circuit to a low-energy sleep state, and to receive a wake signal, switching the radio circuit to a high-energy operational state, the processor circuit being arranged to send the wake signal to the radio circuit sleep/wake input when it switches the radio circuit mode to active mode, and to send the sleep signal to the radio circuit sleep/wake input when it switches the radio circuit mode to reduced-energy mode.

5. The electronic beacon according to claim 1, comprising a battery compartment arranged for receiving a battery for powering the beacon.

6. The electronic beacon according to claim 1, wherein the occupancy sensor is:
    a motion sensor, and/or
    any one of a passive infrared occupancy sensor, ultrasonic occupancy sensor, microwave occupancy sensor, and audio detection occupancy sensor.

7. The electronic beacon according to claim 1, wherein the processor circuit is further configured to:
    transmit the localizing beacon signal at the first repetition rate in the active mode and at the second repetition rate in the reduced-energy mode, the second repetition rate being lower than the first repetition rate; and/or
    reduce the signal strength of the localizing beacon signal in the reduced-energy mode.

8. The electronic beacon according to claim 7, wherein the second repetition rate for transmitting the localizing beacon rate is a percentage of the first repetition rate for transmitting the beacon signal.

9. A control device, the control device comprising:
    an input interface arranged to receive occupancy signals from multiple occupancy sensors,
    an output interface arranged to send an occupancy signal to a beacon,
    a processor circuit configured to:
        determine from the multiple occupancy sensors an occupancy status of an area surrounding the beacon, generating an occupancy signal indicating the occupancy status of an area surrounding the beacon and transmitting said occupancy signal to the beacon, wherein the occupancy status comprises detecting whether a human is detected or not.

10. The control device as in claim 9 comprising:
    a storage arranged to store occupancy signals from the multiple occupancy sensors, wherein the processor circuit is configured to:
        execute a machine learning algorithm for predicting future occupancy signals from the multiple occupancy sensors,
        determine from the multiple occupancy sensors a future occupancy status of an area surrounding the beacon, and generating the occupancy signal indicating the future occupancy status of an area surrounding the beacon and transmitting said occupancy signal to the beacon.

11. A localization system comprising:
    an electronic beacon for providing a localization service, the electronic beacon comprising:
        a radio circuit arranged to transmit a wireless localizing beacon signal, an input interface arranged to receive an occupancy signal indicating an occupancy status of an area surrounding the beacon wherein the occupancy status comprises detecting whether a human is detected or not; and; wherein the occupancy signal is received from an occupancy sensor or from a control computer, and a processor circuit configured to:
maintain a radio circuit mode for the radio circuit, the mode being one of an active mode and a reduced-energy mode,
generate the localizing beacon signal, and
in dependency on the occupancy signal and the occupancy status, switch the radio circuit mode to active mode and periodically transmit the localizing beacon signal through the radio circuit, or switch the radio circuit mode to reduced-energy mode and reduce transmitting of the localizing beacon signal, and one or more occupancy sensors arranged to:
determine occupancy of an area surrounding the occupancy sensor, and
generate an occupancy signal indicating if the occupancy sensor detects occupancy or no occupancy of an area surrounding the occupancy sensor.

12. The localization system as in claim 11 comprising:
a luminaire comprising:
a processor circuit configured to:
activate and deactivate a lighting unit of the luminaire dependent upon an occupancy signal indicating an occupancy status of an area surrounding the luminaire.

13. The localization system according to claim 11, wherein:
the electronic beacon and the occupancy sensor are integrated, and/or
the luminaire and the occupancy sensor are integrated.

14. The localization system according to claim 11, comprising a control device, the control device comprising:
an input interface arranged to receive occupancy signals from multiple occupancy sensors,
an output interface arranged to send an occupancy signal to the beacon and/or to send an occupancy signal to the luminaire, and a processor circuit configured to:
determine from the multiple occupancy sensors an occupancy status of an area surrounding the beacon, generating an occupancy signal indicating the occupancy status of an area surrounding the beacon and transmitting said occupancy signal to the beacon, and/or
determine from the multiple occupancy sensors an occupancy status of an area surrounding the luminaire, generating an occupancy signal indicating the occupancy status of an area surrounding the luminaire and transmitting said occupancy signal to the luminaire.

15. An electronic beacon method comprising:
transmitting a wireless localizing beacon signal,
receiving an occupancy signal indicating an occupancy status of an area surrounding the beacon, wherein the occupancy status comprises detecting whether a human is detected or not,
maintaining a radio circuit mode for the radio circuit, the mode being one of an active mode and a reduced-energy mode,
generating the localizing beacon signal, and
in dependency on the occupancy signal and the occupancy status, switch the radio circuit mode to active mode and periodically transmit the localizing beacon signal through the radio circuit, or switch the radio circuit mode to reduced-energy mode and reduce transmitting of the localizing beacon signal.

16. A control method comprising:
receiving occupancy signals from multiple occupancy sensors,
sending an occupancy signal to a beacon, and
determining from the multiple occupancy sensors an occupancy status of an area surrounding the beacon, wherein the occupancy status comprises detecting whether a human is detected or not; and generating an occupancy signal indicating the occupancy status of an area surrounding the beacon and transmitting said occupancy signal to the beacon.

17. A computer readable medium comprising non-transitory data representing instructions to cause a processor system to perform the method according to claim 15.

* * * * *